(12) United States Patent
Faure

(10) Patent No.: US 7,643,210 B2
(45) Date of Patent: Jan. 5, 2010

(54) NIGHT VISION BINOCULARS

(75) Inventor: Sylvain Faure, Paris (FR)

(73) Assignee: Sagem Defense Securite, Paris (FR)

( * ) Notice: Subject to any disclaimer, the term of this patent is extended or adjusted under 35 U.S.C. 154(b) by 93 days.

(21) Appl. No.: 12/154,874

(22) Filed: May 28, 2008

(65) Prior Publication Data

US 2009/0231694 A1 Sep. 17, 2009

(30) Foreign Application Priority Data

May 29, 2007 (FR) ................................. 07 55304

(51) Int. Cl.
*G02B 23/00* (2006.01)
(52) U.S. Cl. ...................................... 359/407
(58) Field of Classification Search ................. 359/407, 359/480, 482
See application file for complete search history.

(56) References Cited

U.S. PATENT DOCUMENTS

| | | | | |
|---|---|---|---|---|
| 3,195,404 A | * | 7/1965 | Bouwers | 359/669 |
| 4,398,788 A | * | 8/1983 | Dietz | 359/412 |
| 4,568,153 A | * | 2/1986 | Baluteau | 313/524 |
| 4,826,302 A | * | 5/1989 | Afsenius | 313/524 |
| 5,621,567 A | * | 4/1997 | Quint et al. | 359/407 |
| 5,712,726 A | * | 1/1998 | Espie et al. | 359/419 |
| 5,886,814 A | * | 3/1999 | Afsenius | 359/407 |
| 6,025,957 A | * | 2/2000 | Afsenius | 359/400 |

FOREIGN PATENT DOCUMENTS

| | | |
|---|---|---|
| EP | 0677762 A | 10/1995 |
| EP | 0838707 A1 | 4/1998 |
| FR | 2721719 A | 12/1995 |
| GB | 923925 A | 4/1963 |

\* cited by examiner

*Primary Examiner*—Alessandro Amari
*Assistant Examiner*—Mark Consilvio
(74) *Attorney, Agent, or Firm*—Blakely, Sokoloff, Taylor & Zafman LLP

(57) ABSTRACT

A compact night vision binoculars with a first eyepiece channel and a second eyepiece channel and including: an optical separator (8), positioned at the output of a light intensifier tube (2); a plane of reflection (8') common to the first optical channel (BYZC) and the second optical channel (BCW); a first optical combination comprising two first convergent groups (V1, V2) positioned on either side of a first reflective angled surface (5); a second reflective angled surface (6); a second optical combination comprising two second convergent groups (V1', V2') positioned on either side of the common plane of reflection (8'); and a third reflective angled surface (7).

13 Claims, 2 Drawing Sheets

NIGHT VISION BINOCULARS

GENERAL TECHNICAL FIELD

This invention relates to night vision binoculars, comprising an angled input lens, a light intensifier tube—wherein the input lens is combined with the tube to form a first image of a scene from a light flow coming from the scene according to a viewing axis—and an optical separator, positioned at the outlet of the tube and which separates the first image output from the tube into two optical channels, which is to say a first optical channel and a second optical channel.

STATE OF THE PRIOR ART

The prior art discloses many night vision systems (which is to say an observation of a scene in very low lighting conditions).

Some of them are designed to permit hands-free use. In this case, the viewing system is either attached to the user's face by means of a support mask, fitted with straps for example, or attached to a support that is attached to a headset worn by the user.

The viewing systems, designed for example for the movements of a soldier, for driving a vehicle or for carrying out work at night, use in general a 1:1 magnification, so as to provide natural viewing conditions. The invention is especially, but not solely, designed for this type of application.

Night vision systems are traditionally based on the use of an image intensifier tube, comprising a photocathode acting as the input surface, an electron micro-channel transfer and multiplication system, and a phosphorous screen acting as the output surface. A wide angle lens forms an image of the scene observed on the input surface, then the image is electronically intensified, and finally reproduced on the phosphorous screen to be viewed through an eyepiece assembly. The binocular vision is obtained by dividing the flow leaving the tube into two eyepiece channels using an optical separator.

The need to attach night-driving equipment onto the head of the wearer creates significant ergonomic constraints. Indeed, the weight of the equipment and its protruding shape, due to the alignment of the parts—lens, tube, eyepiece—on a viewing axis, leading to a displacement of the centre of gravity of the head and thus modifying the inertia characteristics, which causes problems of fatigue in the neck. Furthermore, the presence of this relatively long (traditionally between 100 and 170 mm) and fragile protuberance, reduces the user's mobility, especially for movements in difficult conditions or when driving a vehicle.

To overcome this problem, angled optical systems exist, in which the lens and the intensifier are orientated in a horizontal or vertical axis or in any angle, perpendicular to the viewing axis. Consequently, the size of the equipment in the viewing axis is reduced and the centre of gravity of the assembly is moved closer to the user. However, this design requires the use of a large number of reflections on each of the optical channels, and causes both a parallax between the viewing axis and the eyepiece axis and a size which is a problem when fitting the headset or the nosepiece of the user.

PRESENTATION OF THE INVENTION

The invention proposes to overcome at least one of these disadvantages: in particular the parallax and the size.

For this purpose, the invention proposes night vision binoculars, comprising:
an angled input lens;
a light intensifier tube, wherein the input lens is combined with the tube to form a first scene image from a light flow coming from the scene according to a viewing axis,
an optical separator, located at the output of the tube which separates the first image at the output of the tube into two optical channels, which is to say a first optical channel and a second optical channel, wherein the binoculars are characterised in that they comprise;
a plane of reflection common to the first optical channel and the second optical channel;
a first optical combination comprising two first convergent groups positioned on either side of a first reflective angled surface, to form, from the first image, a first intermediate image on the first optical channel,
a second reflective angled surface transferring the first intermediate image to the common plane of reflection, so that the first intermediate image is sent to a first eyepiece channel, with an axis parallel to the viewing axis, by said common plane of reflection;
a second optical combination comprising two second convergent groups positioned on either side of the common plane of reflection, to form, from the first image, a second intermediate image on the second optical channel, wherein the common plane of reflection then forms an angle on the second optical channel; and
a third reflective angled surface transferring the second intermediate image to a second eyepiece channel with an axis parallel to the viewing axis.

The invention is advantageously completed by the following characteristics, considered singly or in any possible technical combination:
the light intensifier tube is a video sensor equipped with a viewing screen;
the plane of reflection is a mirror-coated blade or a prism;
the first reflective angled surface is a prism or a flat reflector;
the second reflective angled surface and the third reflective angled surface are each flat reflectors;
the second reflective angled surface and/or the third reflective angled surface and/or at least one of the two first groups and the two second groups have adjustable mountings in at least one axis to permit the parallelism of the two eyepiece channels to be adjusted with respect to one another;
a sub-module comprising
the second convergent group positioned at the outlet of the common plane of reflection,
the third reflective surface, and
an eyepiece,
has a mounting that is adjustable in translation on the second optical channel to permit the adjustment of the distance between axes of the two eyepiece channels with respect to one another;
the optical separator is a semi-reflective blade;
the optical separator is a separator cube;
the binoculars further comprise an auxiliary viewing device associated to an auxiliary channel positioned at the input of the optical separator, wherein the input used by the channel auxiliary is opposite an input used by the tube, wherein an image issued from the auxiliary device can be superposed on or be substituted to the image from the scene on the eyepiece channels;
the binoculars further comprise a shutter between the tube and the optical separator and/or a shutter between the tube and the auxiliary device, so that the images from the scene and/or the auxiliary device may be observed separately in time or simultaneously;

the third reflective surface comprises a beam separator comprising a separator cube or a semi-reflective blade and in which a second auxiliary viewing device is associated opposite the input of this beam separator;

the pupils of the eyepiece channels have a diameter greater than 5 mm, preferably greater than 10 mm.

The invention has many advantages.

The invention permits more compact night vision binoculars to be obtained, while using fewer optical parts.

The binoculars according to the invention are angled and have a reduced dimension in the viewing axis. The centre of gravity of the binoculars is offset towards the user.

The size, especially in the vertical axis, of the binoculars with respect to the viewing axis, is also reduced, which helps the fitting of the headset or the nose piece of the user.

The parallelism of the eyepiece channels can be adjusted in the factory and, in a specific version of the invention, the distance between the axes can be easily adjusted, to adapt the binoculars to suit all users.

The field that may be observed by the user is greater than 40°, preferably equal to or greater than 50°.

The total size of the binoculars is preferably less than (in mm) 85×40×135, with a tube diameter that is preferably equal to or less than 37 mm. The intensifier tube is preferably a tube that does not invert the image, which reduces its costs and weight.

The parallax between the viewing axis of the lens and the right eyepiece is nil in the vertical axis, and less than 15 mm in the horizontal axis. This slight misalignment makes it easier to see objects that are close and, associated with the short length of the binoculars, makes it possible to fire from the shoulder by using the back-sight adjuster or sights of a rifle.

The binoculars permit an auxiliary viewing device to be fitted, such as for example a video device, reproducing for example the video images taken by the sights of a gun or any other source of information that could be useful for the user.

PRESENTATION OF THE FIGURES

Other characteristics, purposes and advantages of the invention will become clear from the following description, which is provided purely by way of illustration and is in no way restrictive, and which is to be read in association with the appended drawings among which:

On all of the figures, similar parts have been given the same numerical references.

DETAILED DESCRIPTION

Figure 1:
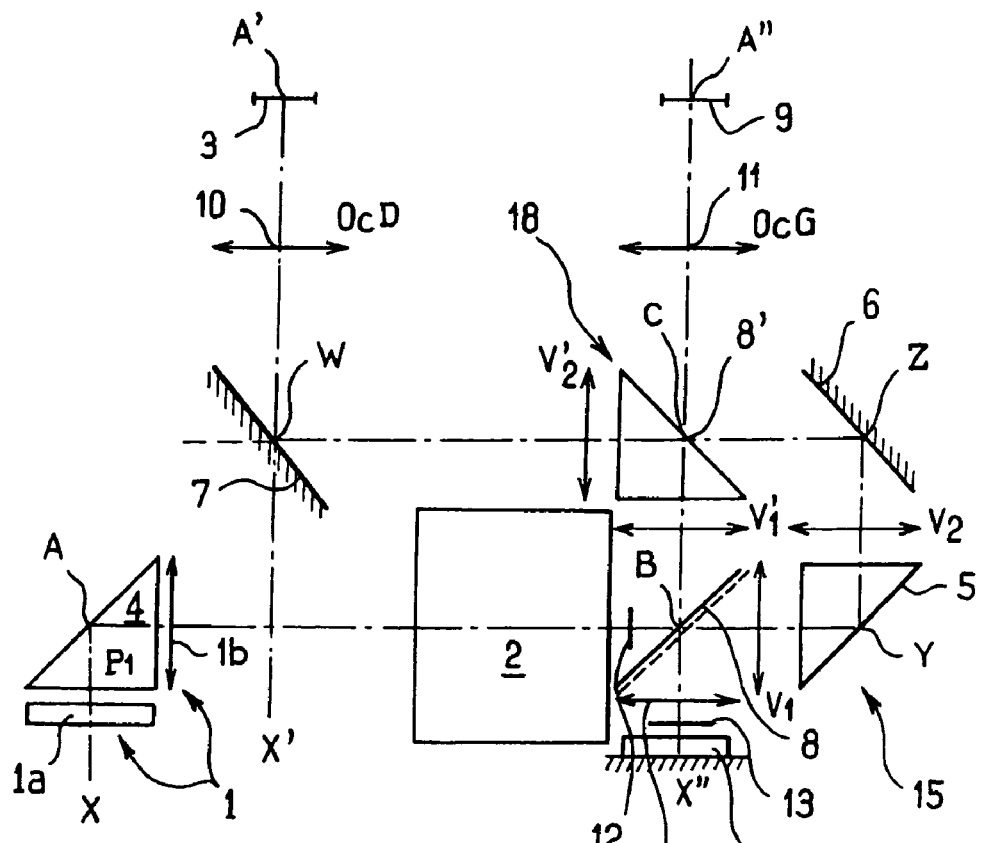
FIG. 1 shows diagrammatically a planar view, with thin lenses, of one embodiment of the night vision binoculars according to the invention.
Figure 2:
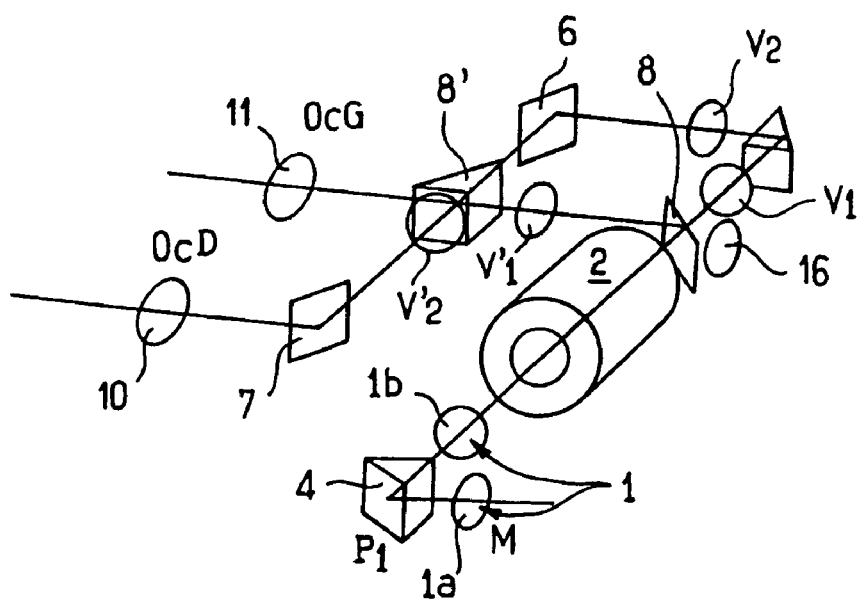
FIG. 2 shows diagrammatically a perspective view of a diagram according to FIG. 1.
Figure 3:
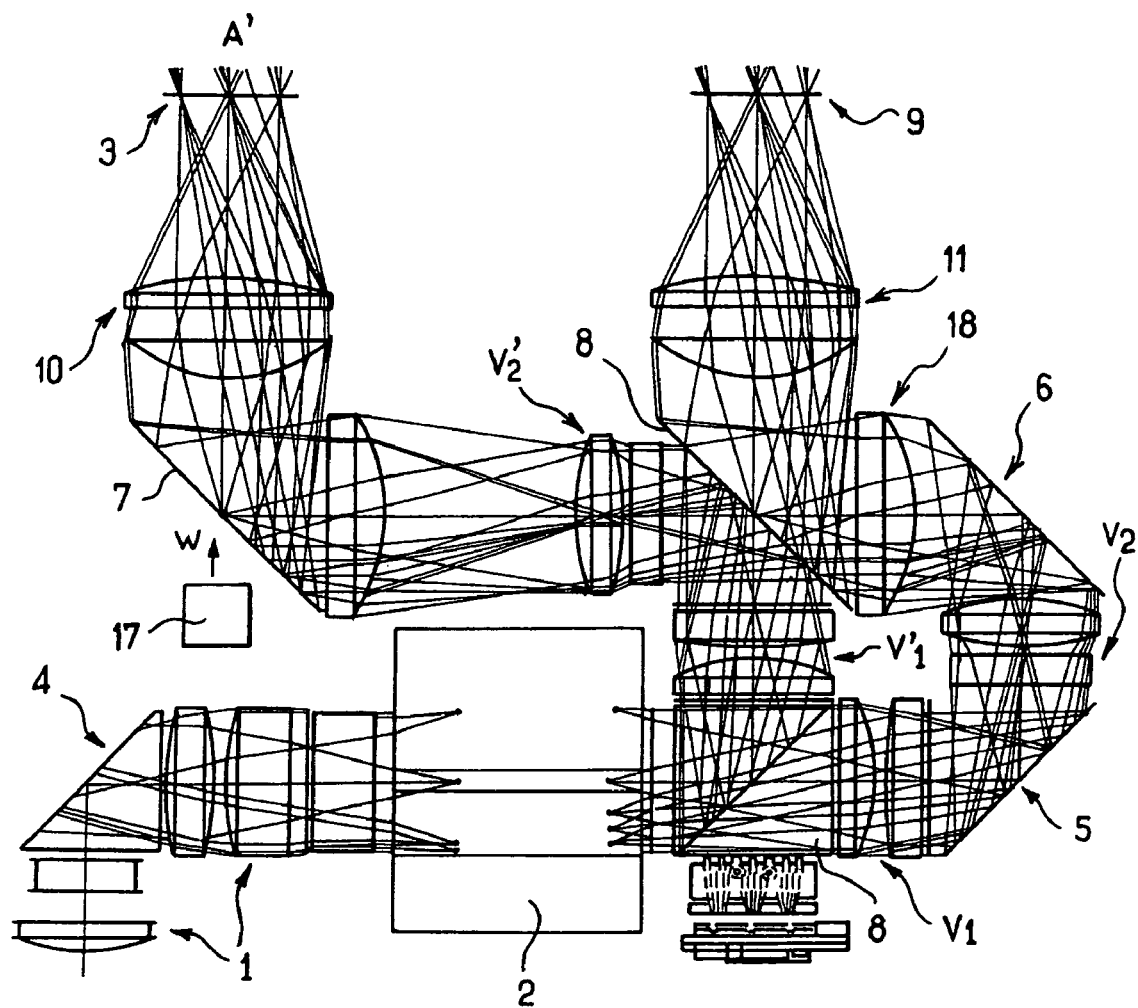
FIG. 3 is a view according to FIG. 1, but of the combination with thick lenses.

One embodiment of binoculars, illustrated by FIGS. 1, 2 and 3, shows the basic layout proposed by the invention:

a main optical channel XAB, angled in A, divided into a viewing axis AX of the binoculars and an optical axis with an axis AB passing through a light intensifier tube 2, two optical channels BYZC and BCW, respectively forming a first optical channel BYZC and a second optical channel BCW, a first eyepiece channel with an optical axis CA", and a second eyepiece channel with an optical axis WA'.

An input lens 1,4 is positioned on the viewing axis AX. It advantageously comprises, as illustrated, two parts 1a and 1b.

The first part 1a is positioned on the viewing axis AX and forms the protective window and possibly the moving focusing unit.

The second part 1b is positioned on the axis AB of a light intensifier tube 2, and forms the convergent unit on the image plane of said intensifier. The lens 1b permits an image of the scene observed through the window 1a to be formed, so that the image is sent to the tube 2.

The lens 1,4 is angled in A with a flat reflector 4—preferably a prism—positioned between the optical parts 1a and 1b.

In the following description, the flat reflectors are made using any technique known to a person skilled in the art, for example using flat blades that have undergone a reflective treatment (metallic, dielectric or holographic), or using half-cube prisms, used for total reflection or having undergone a reflective treatment of the same type.

The input lens 1,4 is combined with the tube 2 to form a first scene image from a light flow coming from the scene according to the viewing axis AX. Consequently, the light flow leaving the lens 1,4 is sent to the intensifier tube 2 to be intensified.

To obtain satisfactory orientation of the image leaving the eyepieces and to minimise the manufacturing costs and the weight of the binoculars, the tube 2 is preferably a tube that does not invert the image. In one specific embodiment of the invention, the light intensifier tube is a video sensor equipped with a viewing screen.

At the outlet of the tube 2, an optical separator 8 is fitted which separates in B the first image leaving the tube 2 into two optical channels, which is to say a first optical channel BYZC and a second optical channel BCW. It may be seen that the optical separator 8 is common to the two optical channels BYZC and BCW.

The separation of the channels, achieved by dividing the light flow, may be obtained either by separation of the pupils, for example by using a reflective part on a half-pupil of the main optical channel, or by using a semi-reflective treatment or spectral band separator, deposited on a flat blade or a separator cube. Preferably, the optical separator 8 is a semi reflective blade.

The first optical channel BYZC will now be described.

At the output of the optical separator 8, the part of the first image transmitted via the optical separator 8 is directed to an optical image transport combination 15. Traditionally, the optical combination 15 permits the transport of an image by forming, from the first image mentioned above, a first intermediate image on the first optical channel BYZC.

For this purpose, the optical combination 15 comprises two first groups, respectively referenced V1 and V2, wherein the two first groups V1 and V2 are convergent and positioned on either side of a first reflective angled surface 5 in Y.

The first reflective surface 5 may be a prism (as shown in FIG. 1). The first reflective surface 5 used is in this case the inside face generated by the hypotenuse of the base of the prism. The first reflective surface 5 may be a mirror (as shown in FIG. 3).

At the output of the optical combination 15, the first intermediate image is sent to a second reflective angled surface 6 in Z.

The second reflective surface 6 sends the first intermediate image to a plane of reflection 8' in C.

The plane of reflection 8' sends the first intermediate image to a first eyepiece channel with an axis CA', wherein the axis CA' is parallel to the viewing axis AX.

As shown in FIG. 1, the plane of reflection 8' may be a prism, wherein the face used to reflect the first intermediate image is the outside face generated by the hypotenuse of the base of the prism. FIG. 3 shows that the plane of reflection may also be a mirror (such as for example a mirror-coated blade). The plane of reflection 8' is reflective on both sides. In this case, a lens 18 permits a beam curve to be obtained that is identical to that obtained with a prism.

It may be seen that the first optical channel BYZC thus comprises three angles, so that the axis BY is parallel to the axis CZ, wherein the axes CZ and BY are perpendicular to the YZ axis.

The second optical channel BCW will now be described.

The part of the first image reflected in B by the optical separator 8 is sent directly to the plane of reflection 8' in C.

As previously seen, the second optical channel BCW comprises an optical combination 18 permitting an image to be transported. Also as previously seen, the optical combination 18 permits an image to be transported thanks to the formation, from the first image, of a second intermediate image on the second optical channel BCW.

For this purpose, the optical combination 18 comprises seconds groups, referenced by V1' and V2', that are convergent and positioned on either side of the plane of reflection 8'.

It may be understood that the plane of reflection 8' is common to the first optical channel BYZC and the second optical channel BCW. The second optical channel BCW uses the reflective face of the plane of reflection opposite the reflective face used in the first optical channel BYZC.

The plane of reflection 8' forms an angle in C on the second optical channel BCW, so that the axis CW is perpendicular to the axis BC.

The second optical channel BCW comprises a third reflective angled surface 7 in W.

The third reflective surface 7 sends the second intermediate image to a second eyepiece channel with an axis WA', wherein WA' is parallel to the viewing axis AX.

The eyepiece channel with an axis WA' corresponding to the right eye of a user comprises an eyepiece 10, preferably comprising a convergent lens, to form a pupil 3. Similarly, the eyepiece channel with an axis CA" corresponding to the left eye of the user comprises an eyepiece 11, preferably comprising a convergent lens, to form a pupil 9.

The pupils 3 and 9 of the eyepiece channels have a diameter greater than 5 mm, and preferably greater than 10 mm.

The channels BCW and BYZC preferably have an optical path of equivalent length, to integrate the same optical groups so as to optimise and reduce the costs. Consequently, in one preferred embodiment of the invention, the groups V1 and V1' are identical, as well as the groups V2 and V2', and the eyepieces 10 and 11.

On the one hand, the planes of reflection of the lens prism 4, of the first oblique separator 8 and the first reflective surface 5 are parallel to one another, in the same that, on the other hand, the planes of reflection of the second reflective surface 6, the plane of reflection 8' and the third reflective surface 7 are parallel to one another. As shown in FIG. 1, the respective planes of reflection of the prism 4, of the optical separator 8 and the first reflective surface 5 are perpendicular to the respective planes of reflection of the second reflective surface 6, the plane of reflection 8' and the third reflective surface 7.

Due to the parallelism between the planes of reflection of the second reflective surface 6 and the third reflective surface 7, there is an invariance of the parallelism between the axes WA' and YZ. Similarly, there is an invariance of the parallelism between the axes CA" and YZ, due to the parallelism between the planes of reflection of the second reflective surface 6 and the plane of reflection 8'.

Preferably and to ensure the parallelism of the axes CA" and WA', the second reflective angled surface 6 and/or the third reflective angled surface 7 and/or at least one of the two first groups V1 and V2 and the two second groups V'1 and V'2 have adjustable mountings in at least one axis. Such mounting permits the adjustment of the parallelism of the two eyepiece channels.

The adjustment of the parallelism of the axes CA" and WA' of the two eyepiece channels is carried out when the binoculars are produced and assembled by removing the first group V1, located at the input of the first reflective surface 5, by removing the second group V1', located at the input of the plane of reflection 8' and by removing the channel AB. It is then possible to look through the channels CWA' and YZCA", that are ideally afocal with a line of sight positioned at the infinite and to modify the position of the second reflective surface 6 and/or the third reflective surface 7 and/or V2 and/or V'2 until the two axes WA' and CA" are parallel.

The adjustment of the parallelism of the axes CA" and WA' of the two eyepiece channels may also be carried out by just modifying the radial position of at least one of the optical groups V1, V2, V'1, V'2, 10 or 11.

Preferably, the sub-group comprising:

the second convergent group V2' positioned at the output of the common plane of reflection 8', the third reflective surface 7, and the eyepiece 10 has a mounting that is adjustable in translation on the axis CW of the second optical channel BCW to permit the adjustment of the distance between axes of the two eyepiece channels with respect to one another.

As may be seen in FIG. 1, the binoculars further comprise most preferably an auxiliary viewing device 14 associated to an auxiliary channel with an axis BX". The auxiliary device 14 is for example a video screen reproducing the images sent by the sights of a gun or by any other source of information that could be useful for the user.

The auxiliary channel with the axis BX" is located at an input B of the optical separator 8, wherein the input used by the auxiliary channel is opposite an input used by the tube 2.

A lens 16, for example a convergent lens, is mounted between the device 14 and the separator 8.

In this way, an image issued from the auxiliary device 14 can be superposed, on the eyepiece channels, on the image from the scene.

The two images may be superposed simultaneously or be consulted by the user independently of one another.

This function may be obtained electronically by switching on simultaneously the intensifier tube and the video screen, or by respectively switching off one or the other depending on the viewing mode desired by the user.

This function may also be obtained mechanically. For this purpose, the binoculars comprise a shutter 12 positioned between the tube 2 and the optical separator 8 and/or a shutter 13 between the tube 2 and the auxiliary device 14, wherein the shutters are actuated independently of one another by the user depending on the requirements. When the shutter 12 is in the closed position and the shutter 13 is in the open position, only the image from the auxiliary device 14 may be seen by the user.

When the shutter 12 is in the open position but the shutter 13 is in the closed position, then only the image from the scene may be seen by the user. When both shutters are in the open position, the two images are superposed.

As may be seen in FIG. 3, the third reflective surface 7 may comprise a beam separator itself comprising a separator cube or a semi-reflective blade. In this case, a second auxiliary viewing device 17 is associated opposite the input of this beam separator and permits additional viewing, such as with an insert for example, but only on the right eyepiece channel WA'.

The invention is not restricted to the examples described and illustrated: the right hand and left hand channels may be inverted with respect to the solutions described above.

The invention claimed is:

1. Night vision binoculars, comprising:
   an angled input lens (1,4);
   a light intensifier tube (2), wherein the input lens is combined with the tube to form a first scene image from a light flow from the scene in a viewing axis (AX),
   an optical separator (8), positioned at the output of the tube (2) which separates the first image at the output of the tube (2) into two optical channels (BYZC, BCW), which is to say a first optical channel (BYZC) and a second optical channel (BCW), wherein the binoculars are characterised in that they comprise;
   a plane of reflection (8') common to the first optical channel (BYZC) and the second optical channel (BCW);
   a first optical combination comprising two first convergent groups (V1, V2) positioned on either side of a first reflective angled surface (5), to form, from the first image, a first intermediate image on the first optical channel (BYZC),
   a second reflective angled surface (6) transferring the first intermediate image to the common plane of reflection (8'), so that the first intermediate image is sent to a first eyepiece channel, with an axis (CA") parallel to the viewing axis (AX), via said common plane of reflection (8');
   a second optical combination comprising two second convergent groups (V'1, V'2) positioned on either side of the common plane of reflection (8'), to form, from the first image, a second intermediate image on the second optical channel (BCW), wherein the common plane of reflection (8') forms an angle on the second optical channel (BCW); and
   a third reflective angled surface (7) transferring the second intermediate image to a second eyepiece channel with an axis (WA') parallel to the viewing axis (AX).

2. Binoculars according to claim 1, in which the light intensifier tube is a video sensor equipped with a viewing screen.

3. Binoculars according to claim 1, in which the plane of reflection (8') is a mirror-coated blade or a prism.

4. Binoculars according to claim 1, in which the first reflective angled surface (5) is a prism or a flat reflector.

5. Binoculars according to claim 1, in which the second reflective angled surface (6) and the third reflective angled surface (7) are both flat reflectors.

6. Binoculars according to claim 1, in which the second reflective angled surface (6) and/or the third reflective angled surface (7) and/or at least one of the two first groups (V1, V2) and the two second groups (V'1, V'2) have adjustable mountings in at least one axis to permit adjustment of the parallelism of the two eyepiece channels (CA", WA') with respect to one another.

7. Binoculars according to claim 1, in which a sub-module comprising:
   the second convergent group (V2') positioned at the output of the common plane of reflection (8'),
   the third reflective surface (7), and
   an eyepiece (10)
   has a mounting that is adjustable in translation (CW) on the second optical channel (BCW) to permit adjustment of the distance between axes of the two eyepiece channels (CA", WA') with respect to one another.

8. Binoculars according to claim 1, in which the optical separator (8) is a semi-reflective blade.

9. Binoculars according to claim 1, in which the optical separator (8) is a separator cube.

10. Binoculars according to claim 1, further comprising an auxiliary viewing device (14) associated to an auxiliary channel (BX") positioned at an input of the optical separator (8), wherein the input used by the auxiliary channel is opposite an input used by the tube (2), wherein an image issued from the auxiliary device can be superposed on or be substituted to the image from the scene on the eyepiece channels (CA", WA').

11. Binoculars according to claim 1, comprising a shutter (12) between the tube (2) and the optical separator (8) and/or an shutter (13) between the tube (2) and the device (14) auxiliary, so that the images from the scene and/or the auxiliary device may be observed separately in time or simultaneously.

12. Binoculars according to claim 1, in which the third reflective surface (7) comprises a beam separator comprising a separator cube or a semi-reflective blade and in which a second auxiliary viewing device (17) is associated opposite the input of this beam separator.

13. Binoculars according to claim 1, in which the pupils (3, 9) of the eyepiece channels (CA", WA') have a diameter greater than 5 mm, preferably greater than 10 mm.

* * * * *